US012674054B2

(12) United States Patent
Okazaki et al.

(10) Patent No.: US 12,674,054 B2
(45) Date of Patent: Jul. 7, 2026

(54) ELASTOMER COMPOSITION, SEALING MATERIAL, AND METHOD FOR PRODUCING SEALING MATERIAL

(71) Applicant: VALQUA, LTD., Tokyo (JP)

(72) Inventors: Masanori Okazaki, Gojo (JP); Naoki Osumi, Gojo (JP)

(73) Assignee: VALQUA, LTD., Tokyo (JP)

( * ) Notice: Subject to any disclaimer, the term of this patent is extended or adjusted under 35 U.S.C. 154(b) by 576 days.

(21) Appl. No.: 18/246,698

(22) PCT Filed: Sep. 9, 2021

(86) PCT No.: PCT/JP2021/033157

§ 371 (c)(1),
(2) Date: Mar. 27, 2023

(87) PCT Pub. No.: WO2022/065054

PCT Pub. Date: Mar. 31, 2022

(65) Prior Publication Data

US 2023/0365801 A1 Nov. 16, 2023

(30) Foreign Application Priority Data

Sep. 28, 2020 (JP) ................................ 2020-162300

(51) Int. Cl.
*C08L 27/12* (2006.01)
*C09K 3/10* (2006.01)

(52) U.S. Cl.
CPC ............ *C08L 27/12* (2013.01); *C09K 3/1009* (2013.01); *C08L 2205/02* (2013.01); *C08L 2312/00* (2013.01); *C09K 2003/1068* (2013.01); *C09K 2200/0637* (2013.01)

(58) Field of Classification Search
CPC .. C08L 27/12; C08L 2205/02; C08L 2312/00; C08L 2205/025; C08L 2205/035; C08L 27/16; C08L 83/04; C09K 3/1009; C09K 2003/1068; C09K 2200/0637; C09K 3/10; C08G 77/20; C08J 2327/16; C08J 3/244; C08J 3/24; F16J 15/102; C08K 5/14; C08K 5/34924; C08K 5/5425
See application file for complete search history.

(56) References Cited

U.S. PATENT DOCUMENTS

| | | | | |
|---|---|---|---|---|
| 6,040,400 | A | 3/2000 | Fukuda et al. | |
| 6,737,479 | B2 | 5/2004 | Faulkner | |
| 6,787,610 | B2 | 9/2004 | Morimoto et al. | |
| 7,135,527 | B2 | 11/2006 | Park | |
| 7,678,858 | B2 | 3/2010 | Tanaka et al. | |
| 7,879,948 | B2 | 2/2011 | Ogata et al. | |
| 8,426,527 | B2 | 4/2013 | Honda et al. | |
| 10,138,352 | B2 | 11/2018 | Sumino et al. | |
| 2002/0099142 | A1 | 7/2002 | Faulkner | |
| 2003/0114599 | A1 | 6/2003 | Morimoto et al. | |
| 2005/0222337 | A1 | 10/2005 | Park | |
| 2006/0235140 | A1 | 10/2006 | Tanaka et al. | |
| 2007/0055020 | A1 | 3/2007 | Park | |
| 2008/0076873 | A1 | 3/2008 | Ogata et al. | |
| 2008/0153986 | A1 | 6/2008 | Maeda et al. | |
| 2009/0093590 | A1 | 4/2009 | Okazaki | |
| 2012/0202950 | A1 | 8/2012 | Honda et al. | |
| 2017/0283585 | A1 | 10/2017 | Sumino et al. | |
| 2020/0277467 | A1 * | 9/2020 | Yasuda | C08L 27/12 |

FOREIGN PATENT DOCUMENTS

| | | | | |
|---|---|---|---|---|
| CN | 101033319 | A | 9/2007 | |
| CN | 104356563 | A | 2/2015 | |
| EP | 2264100 | A1 | 12/2010 | |
| EP | 2264100 | B1 | 1/2017 | |
| JP | H02117945 | A | 5/1990 | |
| JP | H11116684 | A | 4/1999 | |
| JP | H11116685 | A | 4/1999 | |
| JP | 2002097329 | A | 4/2002 | |
| JP | 2003183402 | A | 7/2003 | |
| JP | 2006342241 | A | 12/2006 | |
| JP | 2008056739 | A | 3/2008 | |
| JP | 200895041 | A | 4/2008 | |
| JP | 4628814 | A | 2/2011 | |
| JP | 4720501 | A | 7/2011 | |
| JP | 2013057057 | A | 3/2013 | |
| JP | 2014114383 | A | 6/2014 | |
| JP | 2014118536 | A | 6/2014 | |
| JP | 2015067737 | A | 4/2015 | |
| JP | 2017008166 | A | 1/2017 | |
| KR | 1020120135798 | A | 12/2012 | |
| TW | 201127886 | A1 | 8/2011 | |
| WO | 2004094527 | A1 | 11/2004 | |
| WO | 2006001363 | A1 | 1/2006 | |
| WO | 2006068099 | A1 | 6/2006 | |
| WO | 2009119409 | A1 | 10/2009 | |
| WO | 2016043100 | A1 | 3/2016 | |
| WO | WO-2019054293 | A1 * | 3/2019 | C08K 5/14 |

OTHER PUBLICATIONS

English translation JP2014114383 (Year: 2014).*
English translation JPH02117945A (Year: 1990).*
"Dyneon(TM) Base resistant Elastomer BRE 7231X", Dyneon Technical Information Jan. 1, 2001.

* cited by examiner

*Primary Examiner* — Alicia Bland
(74) *Attorney, Agent, or Firm* — The Webb Law Firm

(57) ABSTRACT

One embodiment of the present invention relates to an elastomer composition, a sealing material, or a method for producing a sealing material, in which the elastomer composition includes a crosslinkable fluoroelastomer (A1) that is other than a perfluoroelastomer and has a fluorine content of 69% by mass or more and a crosslinkable fluoroelastomer (A2) that is other than a perfluoroelastomer and has a fluorine content in a range of 55 to 68% by mass, and a content of the fluoroelastomer (A1) is 60 to 95% by mass based on 100% by mass of the total of the fluoroelastomers (A1) and (A2).

7 Claims, No Drawings

ELASTOMER COMPOSITION, SEALING MATERIAL, AND METHOD FOR PRODUCING SEALING MATERIAL

CROSS-REFERENCE TO RELATED APPLICATIONS

This application is the United States national phase of International Application No. PCT/JP2021/033157 filed Sep. 9, 2021, and claims priority to Japanese Patent Application No. 2020-162300 filed Sep. 28, 2020, the disclosures of which are hereby incorporated by reference in their entireties.

BACKGROUND OF THE INVENTION

Field of the Invention

One embodiment of the present invention relates to an elastomer composition, a sealing material, or a method for producing a sealing material.

Description of Related Art

Conventionally, a sealing material has been widely used in various applications, and among these applications, a sealing material used in, for example, a semiconductor manufacturing apparatus is exemplified as an application of the sealing material applying the most load to the sealing material.

For such a sealing material, a crosslinkable fluoroelastomer such as a fluoroelastomer (FKM) or a perfluoroelastomer (FFKM) is used because a sealing material excellent in plasma resistance and radical resistance can be obtained.

For example, Patent Literature 1: JP 4628814 B2 discloses a sealing material containing a predetermined amount of FFKM and FKM.

The above-described sealing material made of a crosslinkable fluoroelastomer is usually used as a sealing material by molding and crosslinking an elastomer composition that is obtained by blending additives such as a crosslinking agent and a crosslinking aid into the crosslinkable fluoroelastomer.

SUMMARY OF THE INVENTION

Technical Problem

As described above, when an additive is blended in a crosslinkable fluoroelastomer to form an elastomer composition, the components in the elastomer composition need to be uniformly mixed in order to produce a sealing material exhibiting desired physical properties from the elastomer composition.

However, when a conventional crosslinkable fluoroelastomer is used, particularly when a liquid or oily component is used, it takes a long time to produce such a uniform elastomer composition, and there is room for improvement in this respect.

When a sealing material is formed from the produced elastomer composition with high productivity, the elastomer composition is usually formed into a sheet by a sheeting step. This sheeting step is usually performed by passing through an elastomer composition between rolls. In the case of using a conventional elastomer composition, since the elastomer composition is not caught between the rolls or is not well wound around the rolls, it is not easy to form a sheet (the sheeting property is poor). Thus, conventional elastomer compositions have room for improvement in terms of moldability.

Moreover, as a sealing material formed from a conventional elastomer composition, in particular, a sealing material to be used in such applications where generation of particles, for example, in a plasma atmosphere is a problem, a sealing material to which no filler is added or to which a small amount of filler is added is used, but such a sealing material has room for improvement in terms of tensile stress at 100% elongation (100% Mo).

One embodiment of the present invention provides an elastomer composition which can be made into a uniform elastomer composition in a short time and is excellent in moldability, and can form a sealing material having high tensile stress at 100% elongation (100% Mo).

Solution to Problem

As a result of intensive studies to solve the above problems, the present inventor has found that the above problems can be solved according to the following example configuration, and has completed the present invention.

An example configuration of the present invention is as follows.

[1] An elastomer composition including:

a crosslinkable fluoroelastomer (A1) that is other than a perfluoroelastomer and has a fluorine content of 69% by mass or more; and a crosslinkable fluoroelastomer (A2) that is other than a perfluoroelastomer and has a fluorine content in a range of 55 to 68% by mass, in which a content of the fluoroelastomer (A1) is 60 to 95% by mass based on 100% by mass of a total of the fluoroelastomers (A1) and (A2).

[2] The elastomer composition according to [1], in which the fluoroelastomers (A1) and (A2) are peroxide-crosslinkable fluoroelastomers.

[3] The elastomer composition according to [1] or [2], including at least one ethylenically unsaturated bond-containing compound (B) selected from compounds having a perfluoro skeleton having an ethylenically unsaturated bond and compounds having a siloxane skeleton having an ethylenically unsaturated bond.

[4] The elastomer composition according to any one of [1] to [3], including a crosslinking agent.

[5] The elastomer composition according to any one of [1] to [4], in which a content of a filler is 5 parts by mass or less based on 100 parts by mass of a total of the fluoroelastomers (A1) and (A2).

[6] A sealing material obtained from the elastomer composition according to any one of [1] to [5].

[7] A method for producing a sealing material, including a step of crosslinking the elastomer composition according to any one of [1] to [5].

Advantageous Effects of Invention

According to one embodiment of the present invention, it is possible to provide an elastomer composition which can be made into a uniform elastomer composition in a short time and is excellent in moldability, particularly, sheeting property.

In addition, according to one embodiment of the present invention, by using the elastomer composition, it is possible to form a sealing material having high tensile stress at 100% elongation (100% Mo), and in particular, it is possible to obtain a sealing material excellent in hardness, tensile strength, elongation at break, and 100% Mo in a well-balanced manner.

Moreover, according to one embodiment of the present invention, it is possible to obtain a sealing material excellent in, for example, plasma resistance (radical resistance), crack resistance, and compression set. Thus, the sealing material can be suitably used as a sealing material for a semiconductor manufacturing apparatus and a sealing material for a plasma processing apparatus.

DESCRIPTION OF THE INVENTION

<<Elastomer Composition>>

The elastomer composition according to one embodiment of the present invention (hereinafter, also referred to as the "present composition") includes a crosslinkable fluoroelastomer (A1) that is other than a perfluoroelastomer and has a fluorine content of 69% by mass or more and a crosslinkable fluoroelastomer (A2) that is other than a perfluoroelastomer and has a fluorine content in a range of 55 to 68% by mass, and the content of the fluoroelastomer (A1) is 60 to 95% by mass based on 100% by mass of the total of the fluoroelastomers (A1) and (A2).

In the present invention, "elastomer" and "rubber" have the same meaning, and are not particularly distinguished from each other.

<Crosslinkable Fluoroelastomer (A1) and Crosslinkable Fluoroelastomer (A2)>

The crosslinkable fluoroelastomer (A1) is not particularly limited as long as it is a crosslinkable fluoroelastomer that is other than a perfluoroelastomer and has a fluorine content of 69% by mass or more, and the crosslinkable fluoroelastomer (A2) is not particularly limited as long as it is a crosslinkable fluoroelastomer that is other than a perfluoroelastomer and has a fluorine content in a range of 55 to 68% by mass.

As long as each fluorine content of the crosslinkable fluoroelastomer (A1) and the crosslinkable fluoroelastomer (A2) is in the above range, the kinds of constituent units constituting these elastomers may be the same or different.

The fluoroelastomer (A1) contained in the present composition may be one kind or two or more kinds. The fluoroelastomer (A2) contained in the present composition may be one kind or two or more kinds.

Hereinafter, the crosslinkable fluoroelastomer (A1) and the crosslinkable fluoroelastomer (A2) are also collectively referred to as a crosslinkable fluoroelastomer (A).

The crosslinkable fluoroelastomer (A) is also referred to as unvulcanized fluororubber, and examples of the crosslinking type include a peroxide crosslinking type, a polyol crosslinking type, an amine crosslinking type, and a radiation crosslinking type. Among them, the fluoroelastomer is preferably a peroxide-crosslinkable fluoroelastomer from the viewpoint that, for example, it is not necessary to use an acid acceptor that may be a generation source of particles, for example, in a plasma atmosphere, and thus there is no risk of generating particles during use of the obtained sealing material.

Specific examples of the crosslinkable fluoroelastomer (A) include a fluoroelastomer (FKM), a tetrafluoroethylene-propylene elastomer (FEPM), and a fluorine thermoplastic elastomer (for example, an elastomer containing at least one elastomeric polymer chain segment and at least one non-elastomeric polymer chain segment, at least one of which is a fluorine-containing polymer chain segment).

As the crosslinkable fluoroelastomer (A1), an elastomer capable of providing a sealing material exhibiting resistance to plasma (plasma etching treatment) used in various semiconductor dry processes is preferable, and FKM is more preferable because of relatively good plasma resistance and excellent sealability. In addition, FKM is also preferable from the viewpoints of, for example, being inexpensive and versatile.

As the crosslinkable fluoroelastomer (A2), FKM and FEPM are preferable, and of these, FKM is more preferable for the same reason as the crosslinkable fluoroelastomer (A1).

As the crosslinkable fluoroelastomer (A), one synthesized by a conventionally known method may be used, or a commercially available product may be used. Examples of the commercially available product include "DAI-EL" manufactured by DAIKIN INDUSTRIES, LTD., "VITON" manufactured by The Chemours Company, "Dyneon" manufactured by 3M Company, and "Tecnoflon" manufactured by Solvay.

The fluorine content of the crosslinkable fluoroelastomer (A1) is 69% by mass or more, preferably 70% by mass or more, and preferably 73% by mass or less, more preferably 71% by mass or less.

The fluorine content of the crosslinkable fluoroelastomer (A2) is 55 to 68% by mass, preferably 60 to 68% by mass, more preferably 63 to 68% by mass, and still more preferably 65 to 68% by mass.

By using at least two crosslinkable fluoroelastomers having a fluorine content in the above range, a uniform elastomer composition can be made in a short time, an elastomer composition excellent in moldability can be easily obtained, and a sealing material having high 100% Mo, particularly being excellent in hardness, tensile strength, elongation at break, and 100% Mo in a well-balanced manner can be easily obtained.

The fluorine content can be measured and calculated by, for example, elemental analysis of fluorine using, for example, $^{19}$F-NMR, or $^{1}$H-NMR or mass spectrometry (MS spectrum method).

The fluorine content in the present invention is a value obtained by rounding to the nearest Integer.

The Mooney viscosity of the crosslinkable fluoroelastomer (A) is preferably 10 or more, more preferably 15 or more, still more preferably 18 or more, and preferably 140 or less, more preferably 120 or less, still more preferably 80 or less, particularly preferably 60 or less.

When the Mooney viscosity of the crosslinkable fluoroelastomer (A) is in the above range, an elastomer composition excellent in moldability, particularly, sheeting property can be easily obtained.

In the present specification, the Mooney viscosity refers to a Mooney viscosity (ML 1+10) at 121° C. measured in accordance with ASTM D 1646.

As one aspect of the crosslinkable fluoroelastomer (A1), it is preferable to use a crosslinkable fluoroelastomer (A1-1) having a Mooney viscosity preferably in a range of 40 to 140, more preferably 40 to 120, and still more preferably 40 to 60, and a crosslinkable fluoroelastomer (A1-2) having a Mooney viscosity preferably in a range of 10 or more and less than 40, and more preferably 10 to 30.

The use of the crosslinkable fluoroelastomers (A1-1) and (A1-2) is preferable because the normal physical properties of the resulting sealing material such as hardness, tensile strength, elongation at break, and 100% Mo and the physical properties of the elastomer composition such as moldability, particularly sheeting property are more excellent in a well-balanced manner.

When the crosslinkable fluoroelastomers (A1-1) and (A1-2) are used as the crosslinkable fluoroelastomer (A1), the content of the crosslinkable fluoroelastomer (A1-1) is preferably 20 to 80% by mass based on 100% by mass of the total of the crosslinkable fluoroelastomers (A1-1) and (A1-2).

The content of the crosslinkable fluoroelastomer (A1-1) is preferably in the above range because the normal physical properties of the resulting sealing material such as hardness, tensile strength, elongation at break, and 100% Mo and the physical properties of the elastomer composition such as moldability, particularly sheeting property are more excellent in a well-balanced manner.

The content of the crosslinkable fluoroelastomer (A1) in the solid content of the present composition is preferably 40% by mass or more, more preferably 50% by mass or more, and preferably 95% by mass or less, more preferably 85% by mass or less.

When the content of the crosslinkable fluoroelastomer (A1) is in the above range, a sealing material excellent in plasma resistance and chemical resistance such as resistance to chemicals can be easily obtained.

In the present specification, the solid content refers to a component other than a solvent.

The content of the crosslinkable fluoroelastomer (A2) in the solid content of the present composition is preferably 2% by mass or more, more preferably 5% by mass or more, and preferably 50% by mass or less, more preferably 40% by mass or less.

When the content of the crosslinkable fluoroelastomer (A2) is in the above range, a sealing material excellent in moldability and chemical resistance in a well-balanced manner can be easily obtained.

The content of the crosslinkable fluoroelastomer (A1) is 60% by mass or more, preferably 65% by mass or more, and 95% by mass or less, preferably 90% by mass or less based on the total content of the crosslinkable fluoroelastomers (A1) and (A2) in the present composition.

When the mass ratio of the contents of the crosslinkable fluoroelastomers (A1) and (A2) is in the above range, a uniform elastomer composition can be made in a short time, an elastomer composition excellent in moldability can be easily obtained, and a sealing material having high 100% Mo, particularly being excellent in hardness, tensile strength, elongation at break, and 100% Mo in a well-balanced manner can be easily obtained.

[FKM]

The FKM is not particularly limited, but examples thereof include polymers containing a hydrogen atom (carbon-hydrogen bond) in the polymer main chain, and specifically, it is preferable to contain a constituent unit derived from vinylidene fluoride.

The FKM is not particularly limited, but specific examples thereof include a vinylidene fluoride-hexafluoropropylene polymer; a vinylidene fluoride-hexafluoropropylene-tetrafluoroethylene polymer; a vinylidene fluoride-propylene-tetrafluoroethylene polymer; an ethylene-tetrafluoroethylene-perfluoroalkyl vinyl ether polymer; and a vinylidene fluoride-tetrafluoroethylene-perfluoroalkyl vinyl ether polymer.

Preferred example of the perfluoroalkyl vinyl ether is perfluoromethyl vinyl ether.

Among them, a ternary polymer is preferable, and a vinylidene fluoride-hexafluoropropylene-tetrafluoroethylene polymer is more preferable from the viewpoint of, for example, being excellent in, for example, plasma resistance, heat resistance, and resistance to chemicals.

The peroxide-crosslinkable fluoroelastomer preferably has a functional group such as an iodine group, a bromine group, a cyano group, a peroxy group, or an unsaturated group, and more preferably has an iodine group or a bromine group from the viewpoint of ease of introduction of the functional group.

The fluoroelastomer having an iodine group and/or a bromine group can be obtained, for example, by using one or more kinds of saturated or unsaturated iodine-containing and/or bromine-containing compound(s) at the time of synthesis of the elastomer.

Examples of the iodine-containing and/or bromine-containing compound include compounds represented by the following formula (1) or (2).

By using the compound represented by the following formula (1), a fluoroelastomer having an iodine group and/or a bromine group in a side chain can be synthesized, and by using the compound represented by the following formula (2), a fluoroelastomer having an iodine group and/or a bromine group at a terminal can be synthesized.

$$CY^1_2{=}CY^2RfX \qquad (1)$$

wherein $Y^1$ and $Y^2$ are each independently a fluorine atom, a hydrogen atom, or a methyl group, Rf is a linear or branched fluorine-containing alkylene group in which some or all of the hydrogen atoms are substituted with a fluorine atom, or a group containing an ether bond in a part of the fluorine-containing alkylene group, and X is an iodine atom or a bromine atom.

Specific examples of the compound represented by the formula (1) include the compounds described in WO 2009/119409 A.

$$I_nBr_mR \qquad (2)$$

wherein R is a fluorohydrocarbon group having 1 to 12 carbon atoms, subscripts n and m are each independently an integer of 0 to 2, and n+m is 1 or 2.

Specific examples of the compound represented by the formula (2) include compounds described in JP 2002-97329 A and JP 2008-56739 A.

<Ethylenically Unsaturated Bond-Containing Compound (B)>

In the present composition, it is preferable to use the ethylenically unsaturated bond-containing compound (B) from the viewpoint of, for example, being capable of easily obtaining a non-adhesive sealing material having excellent plasma resistance.

The compound (B) is at least one compound selected from compounds (B1) having a perfluoro skeleton having an ethylenically unsaturated bond and compounds (B2) having a siloxane skeleton having an ethylenically unsaturated bond. Of these, the compound (B) preferably contains the compound (B1) from the viewpoint of, for example, being capable of easily obtaining a sealing material having more excellent plasma resistance.

Examples of the ethylenically unsaturated bond include alkenyl groups having 2 to 8 carbon atoms such as a vinyl group, a methylvinyl group, an allyl group, a propenyl group, an isopropenyl group, a butenyl group, a pentenyl group, a hexenyl group, and a heptenyl group, a vinylphenyl group, a (meth)acryloyl group, an allyloxy group, a styryl group, and a propargyl group. Among them, the ethylenically unsaturated bond is preferably an alkenyl group, more preferably an alkenyl group having 2 to 4 carbon atoms, and particularly preferably a vinyl group.

The compound (B) may have two or more kinds of ethylenically unsaturated bonds.

As the compound (B), a compound synthesized by a conventionally known method may be used, or a commercially available product may be used. The commercially available product is, for example, "SIFEL" (manufactured by Shin-Etsu Chemical Co., Ltd.).

Examples of the commercially available product containing the compound (B) include commercially available products of one-component type and commercially available products of two-component type, and any of these may be used. Examples of the commercially available product containing the compound (B) include products in a liquid form, a paste form, an oil form, and a millable form, but any of these may be used.

When a commercially available product is used as the compound (B), the commercially available product may contain additives such as a reactive organosilicon compound having two or more hydrosilyl groups in the molecule (for example, an organosilicon compound described in, for example, JP 2003-183402 A or JP H11-116684 A), a catalyst (for example, a catalyst described in, for example, JP 2003-183402 A or JP H11-116684 A), and a filler (for example, silica), and as the compound (B), one containing these additives may be used.

When the present composition includes the compound (B), the content of the compound (B) in the present composition is preferably 0.5 parts by mass or more, more preferably 1 part by mass or more, and preferably 50 parts by mass or less, more preferably 25 parts by mass or less, still more preferably 10 parts by mass or less based on 100 parts by mass of the crosslinkable fluoroelastomer (A) from the viewpoints that, for example, a uniform elastomer composition can be made in a shorter time, and a sealing material having more excellent plasma resistance can be easily obtained.

When the present composition includes the compound (B) and the following crosslinking agent, the mass ratio of the content of the compound (B) to the content of the crosslinking agent in the present composition (the content of the compound (B)/the content of the crosslinking agent) is preferably 0.5 or more, more preferably 1 or more, and preferably 20 or less, more preferably 10 or less, from the viewpoint that, for example, a sealing material having more excellent plasma resistance can be easily obtained.

[Compound (B1)]

The compound (B1) is a compound other than the crosslinkable fluoroelastomer (A).

Examples of the compound (B1) include compounds having a perfluoropolyether structure having an ethylenically unsaturated bond and compounds having a perfluoroalkylene structure having an ethylenically unsaturated bond, and among these compounds, compounds having a perfluoropolyether structure having an ethylenically unsaturated bond (hereinafter, also referred to as "compounds (B1-1)") are preferable.

When the present composition contains the compound (B1), the compound (B1) contained in the present composition may be one kind or two or more kinds.

Compound (B1-1)

The compound (B1-1) is preferably a perfluoropolyether having two or more ethylenically unsaturated bonds in one molecule.

Preferred examples of the compound (B1-1) include compounds described in JP 2003-183402 A, JP H11-116684 A, JP H11-116685 A, and JP 2015-67737 A.

Examples of the compound (B1-1) include compounds represented by the following formula (1).

$$Z^1—(X)_p—(Rf\text{-}Q)_a\text{-}Rf—(X)_p—Z^2 \quad (1)$$

X is independently $—CH_2—$, $—CH_2O—$, $—CH_2OCH_2—$, $*—Si(R^2)_2\text{-}Ph\text{-}$ (wherein Ph: phenylene group), $*—Y—NR^1SO_2—$ or $*—Y—NR^1—CO—$ (wherein Y is $—CH_2—$ or $*—Si(R^2)_2\text{-}Ph\text{-}$, and the moiety is bonded to $Z^1$ or $Z^2$).

Rf is a divalent perfluoropolyether group (divalent perfluorooxyalkylene group).

The subscript p is independently 0 or 1. The subscript a is an integer of 0 or more, preferably an integer of 0 to 10, and more preferably an integer of 0 to 6.

Q is a group represented by the following formula (2), (3), or (4).

$R^2$ is a substituted or unsubstituted monovalent hydrocarbon group having 1 to 10 carbon atoms, particularly 1 to 8 carbon atoms, and examples thereof include alkyl groups such as a methyl group, an ethyl group, a propyl group, an isopropyl group, a butyl group, an isobutyl group, a t-butyl group, a pentyl group, a hexyl group, an octyl group, and a decyl group; cycloalkyl groups such as a cyclopentyl group, a cyclohexyl group, and a cycloheptyl group; alkenyl groups such as a vinyl group, an allyl group, a propenyl group, an isopropenyl group, a butenyl group, and a hexenyl group; aryl groups such as a phenyl group, a tolyl group, a xylyl group, and a naphthyl group; aralkyl groups such as a benzyl group, a phenylethyl group, and a phenylpropyl group; and substituted forms of these groups in which some or all of the hydrogen atoms are substituted with, for example, a halogen atom (for example, a chloromethyl group, chloropropyl group, a bromoethyl group, and fluorine-substituted alkyl groups such as a 3,3,3-trifluoropropyl group and a 6,6,6,5,5,4,4,3,3-nonafluorohexyl group).

$R^1$ is a hydrogen atom or a substituted or unsubstituted monovalent hydrocarbon group having 1 to 10 carbon atoms, particularly 1 to 8 carbon atoms which is the same as the group exemplified for $R^2$, and examples of $R^1$ include a hydrogen atom and groups which are the same as groups for $R^2$, and specifically include alkyl groups such as a methyl group, an ethyl group, a propyl group, and an isopropyl group; cycloalkyl groups such as a cyclohexyl group; alkenyl groups such as a vinyl group and an allyl group, aryl groups such as a phenyl group and a tolyl group; and substituted forms of these groups in which some of the hydrogen atoms are substituted with, for example, a halogen atom (for example, a chloromethyl group, a chloropropyl group, and fluorine-substituted alkyl groups such as a 3,3,3-trifluoropropyl group and a 6,6,6,5,5,4,4,3,3-nonafluorohexyl group).

$Z^1$ and $Z^2$ are each independently an ethylenically unsaturated bond-containing group, and may be —Si(ethylenically unsaturated bond-containing group)$(R')_2$.

The ethylenically unsaturated bond-containing group is preferably a monovalent alkenyl group, more preferably a monovalent alkenyl group having 2 to 4 carbon atoms, and particularly preferably a monovalent vinyl group.

R' is independently a substituted or unsubstituted monovalent hydrocarbon group, and specific examples thereof include alkyl groups such as a methyl group, an ethyl group, a n-propyl group, an i-propyl group, a n-butyl group, an i-butyl group, a t-butyl group, a pentyl group, and a hexyl group; aryl groups such as a phenyl group, a tolyl group, and a xylyl group; and halogenated alkyl groups such as a 3-chloropropyl group and a 3,3,3-trifluoropropyl group. Among these, an alkyl group having 1 to 5 carbon atoms is preferable.

[Chemical Formula 1]

(2)

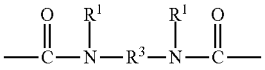

(3)

$$-(X)_p-CH_2CH_2R^4CH_2CH_2-(X)_p-$$

(4)

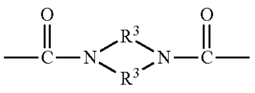

In Formulae (2) to (4), X, p and $R^1$ are as defined for X, p and $R^1$ in the formula (1). $R^3$ and $R^4$ are each independently a substituted or unsubstituted divalent hydrocarbon group in which one or more atoms selected from an oxygen atom, a nitrogen atom, a silicon atom, and a sulfur atom may be interposed between the bonding, and $R^3$ in Formula (2) and $R^4$ in Formula (3) may each independently be a group represented by the following formula (5) or (6).

[Chemical Formula 2]

(5)

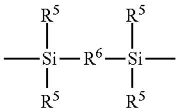

(6)

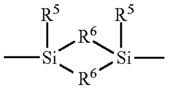

In Formulae (5) and (6), $R^5$ is a substituted or unsubstituted monovalent hydrocarbon group, and $R^6$ is a group containing one or more atoms selected from a carbon atom, an oxygen atom, a nitrogen atom, a silicon atom, and a sulfur atom.

$R^3$ and $R^4$ are not particularly limited as long as they are substituted or unsubstituted divalent hydrocarbon groups, but divalent hydrocarbon groups having 1 to 20 carbon atoms, particularly 2 to 12 carbon atoms are suitable, and specific examples thereof include alkylene groups such as a methylene group, an ethylene group, a propylene group, a methylethylene group, a butylene group, and a hexamethylene group; cycloalkylene groups such as a cyclohexylene group; arylene groups such as a phenylene group, a tolylene group, a xylylene group, a naphthylene group, and a biphenylene group; substituted forms of these groups in which some of the hydrogen atoms are substituted with, for example, a halogen atom; and combinations of these substituted or unsubstituted alkylene groups and/or arylene groups.

Preferably, $-(X)_p-(Rf\text{-}Q)_a\text{-}Rf-(X)_p-$ is $-(O-R^7)_n-$ [wherein $R^7$ represents a perfluoroalkanediyl group, subscript n represents an integer of 2 or more, and plural $R^7$ groups may be the same or different from each other].

Examples of the perfluoroalkanediyl group represented by $R^7$ include groups represented by $C_mF_{2m}$ (wherein subscript m is an integer of 2 or more), and the perfluoroalkanediyl group may be linear or branched. The number of carbon atoms of the perfluoroalkanediyl group (that is, subscript m) is, for example, 1 to 10, preferably 2 to 6, more preferably 2 to 4, and particularly preferably 2 to 3.

The subscript n may be 2 or more, and is, for example, 10 or more, preferably 40 or more, and more preferably 70 or more. Also, subscript n is, for example, 300 or less, preferably 200 or less, and more preferably 150 or less.

Also, $-(O-R^7)_n-$ may be a group which is the same as the following Rf.

The compound represented by the formula (1) is preferably a compound represented by the following formula (1-1).

$$CH_2{=}CH-(X)_p-(Rf\text{-}Q)_a\text{-}Rf-(X)_p-CH{=}CH_2 \quad (1\text{-}1)$$

[The definition of each symbol in Formula (1-1) is the same as the definition of each symbol in Formula (1).]

The compound represented by the formula (1-1) is preferably a compound in which subscript a is 0, and in this case, the compound is represented by the following formula (1-1-1).

$$CH_2{=}CH-(X)_p-Rf-(X)_p-CH{=}CH_2 \quad (1\text{-}1\text{-}1)$$

[The definition of each symbol in Formula (1-1-1) is the same as the definition of each symbol in Formula (1).]

Specific examples of the Rf include the following groups.

$$-[CF(Z)OCF_2]_p-(CF_2)_r\text{-}[CF_2OCF(Z)]_q-$$

(wherein Z is a fluorine atom or $-CF_3$, and subscripts p, q, and r are integers satisfying $p\geq1$, $q\geq1$, $2\leq p+q\leq200$, preferably $2\leq p+q\leq110$, and $0\leq r\leq6$), $$-CF_2CF_2OCF_2-(CF(CF_3)OCF_2)_s-(CF_2)_r-(CF_2OCF(CF_3))_t-CF_2OCF_2CF_2-$$

(wherein subscripts r, s, and t are integers satisfying $0\leq r\leq6$, $s\geq0$, $t\geq0$, $0\leq s+t\leq200$, and preferably $2\leq s+t\leq110$), $$-CF(Z)-(OCF(Z)CF_2)_u-(OCF_2)_v-OCF(Z)-$$

(wherein Z is a fluorine atom or $-CF_3$, and subscripts u and v are integers satisfying $1\leq u\leq100$ and $1\leq v\leq50$), $$-CF_2CF_2-[OCF_2CF_2CF_2]_w-OCF_2CF_2-$$

(wherein subscript w is an integer satisfying $1\leq w\leq100$)

[Compound (B2)]

The compound (B2) is preferably a polysiloxane having two or more ethylenically unsaturated bonds in one molecule, and is preferably an organopolysiloxane having two or more ethylenically unsaturated bonds in one molecule and having an organic group bonded to its silicon atom. The bonding site of the ethylenically unsaturated bond is not particularly limited.

When the present composition contains the compound (B2), the compound (B2) contained in the present composition may be one kind or two or more kinds.

Examples of the organic group bonded to the silicon atom include the ethylenically unsaturated bond, a linear alkyl group, a branched alkyl group, a cyclic alkyl group, an aryl group, an aralkyl group, and a halogenated alkyl group.

Examples of the linear alkyl group include groups having 1 to 20 carbon atoms, preferably 1 to 6 carbon atoms, such as a methyl group, an ethyl group, a propyl group, a hexyl group, an octyl group, and a decyl group.

Examples of the branched alkyl group include groups having 1 to 20 carbon atoms, preferably 1 to 6 carbon atoms, such as an isopropyl group, an isobutyl group, a t-butyl group, and a 2-ethylhexyl group.

Examples of the cyclic alkyl group include groups having 3 to 20 carbon atoms such as a cyclopentyl group and a cyclohexyl group.

Examples of the aryl group include groups having 6 to 20 carbon atoms such as a phenyl group and a tolyl group.

Examples of the aralkyl group include groups having 7 to 20 carbon atoms such as a benzyl group, a 2-phenylethyl group, and a 2-methyl-2-phenylethyl group.

Examples of the halogenated alkyl group include groups having 1 to 20 carbon atoms, preferably 1 to 6 carbon atoms, such as a 3,3,3-trifluoropropyl group, a 2-(nonafluorobutyl) ethyl group, and a 2-(heptadecafluorooctyl)ethyl group.

As the organic group bonded to the silicon atom, a linear alkyl group, an alkenyl group, and an aryl group are preferable, a linear alkyl group that has 1 to 6 carbon atoms, an alkenyl group, and an aryl group are more preferable, and a methyl group, a vinyl group, and a phenyl group are particularly preferable.

The molecular structure of the compound (B2) is not particularly limited, and examples thereof include linear, branched, partially branched linear, and dendritic (dendrimer-like) and preferred structure being linear and partially branched linear. The compound (B2) may be a single polymer having such a molecular structure, a copolymer having such a molecular structure, or a mixture of two or more of these polymers.

Examples of the compound (B2) include dimethylpolysiloxane capped at both molecular chain terminals with dimethylvinylsiloxy groups, dimethylpolysiloxane capped at both molecular chain terminals with methylphenylvinylsiloxy groups, dimethylsiloxane-methylphenylsiloxane copolymers capped at both molecular chain terminals with dimethylvinylsiloxy groups, dimethylsiloxane-methylvinylsiloxane copolymers capped at both molecular chain terminals with dimethylvinylsiloxy groups, dimethylsiloxane-methylvinylsiloxane copolymers capped at both molecular chain terminals with silanol groups, dimethylsiloxane-methylvinylsiloxane-methylphenylsiloxane copolymers capped at both molecular chain terminals with silanol groups, dimethylsiloxane-methylvinylsiloxane copolymers capped at both molecular chain terminals with trimethylsiloxy groups, methyl(3,3,3-trifluoropropyl)polysiloxane capped at both molecular chain terminals with dimethylvinylsiloxy groups, organosiloxane copolymers including a siloxane unit represented by Formula: $(CH_3)_3SiO_{1/2}$, a siloxane unit represented by Formula: $(CH_3)_2(CH_2{=}CH)SiO_{1/2}$, a siloxane unit represented by Formula: $CH_3SiO_{3/2}$, and a siloxane unit represented by Formula: $(CH_3)_2SiO_{2/2}$, and compounds represented by the following formula (7).

[Chemical Formula 3]

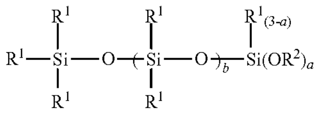

(7)

In Formula (7), $R^1$ is each independently an unsubstituted or substituted monovalent hydrocarbon group, $R^2$ is independently an alkyl group, an alkoxyalkyl group, an alkenyl group, or an acyl group, subscript b is an integer of 2 to 100, and subscript a is an integer of 1 to 3, provided that at least two of $R^1$ and $R^2$ in Formula (7) contain the ethylenically unsaturated bond.

In Formula (7), $R^1$ is each independently an unsubstituted or substituted monovalent hydrocarbon group having preferably 1 to 10 carbon atoms, and examples thereof include groups which are the same as the groups exemplified for the organic group bonded to the silicon atom. Among them, a monovalent hydrocarbon group having 1 to 6 carbon atoms is preferable, and an alkenyl group, an aryl group, and an alkyl group having 1 to 3 carbon atoms are more preferable.

Examples of the alkyl group and alkenyl group in $R^2$ in Formula (7) include a linear alkyl group, a branched alkyl group, a cyclic alkyl group, and an alkenyl group which are the same as the groups exemplified for the organic group bonded to the silicon atom.

Examples of the alkoxyalkyl group in $R^2$ in Formula (7) include groups having 2 to 10 carbon atoms such as a methoxyethyl group and a methoxypropyl group.

Examples of the acyl group in $R^2$ in Formula (7) include groups having 2 to 10 carbon atoms such as an acetyl group and an octanoyl group.

The subscript b in Formula (7) is preferably an integer of 10 to 50, and subscript a is preferably 3.

<Crosslinking Agent>

The crosslinkable fluoroelastomer (A) can be crosslinked without using a crosslinking agent, but the present composition preferably includes a crosslinking agent depending on the kind of crosslinkable fluoroelastomer (A) to be used from the viewpoints of, for example, being sufficiently crosslinked, and being capable of easily obtaining a sealing material excellent in hardness, tensile strength, elongation at break, and 100% Mo in a well-balanced manner.

When the present composition contains a crosslinking agent, the crosslinking agent contained in the present composition may be one kind or two or more kinds.

As the crosslinking agent, a conventionally known crosslinking agent can be used without particular limitation, and may be appropriately selected depending on the kind of crosslinkable fluoroelastomer (A) to be used. For example, when FKM is used, examples thereof include peroxide crosslinking agents, polyamine crosslinking agents, polyol crosslinking agents, and triazine crosslinking agents.

Among them, a peroxide crosslinking agent is preferable from the viewpoint that, for example, it is not necessary to blend an acid acceptor such as magnesium oxide or calcium hydroxide, which may become a generation source of particles, in the present composition, for example, in a plasma atmosphere, and thus there is no risk of generating particles during use of the obtained sealing material.

Examples of the peroxide crosslinking agent include 2,5-dimethyl-2,5-di(t-butylperoxy)hexane, dicumyl peroxide, 2,4-dichlorobenzoyl peroxide, di-t-butyl peroxide, t-butyldicumyl peroxide, benzoyl peroxide, 2,5-dimethyl-2,5-(t-butylperoxy)hexyne-3, 2,5-dimethyl-2,5-di(benzoylperoxy)hexane, α,α'-bis(t-butylperoxy-m-isopropyl)benzene, t-butylperoxy isopropyl carbonate, di-(4-t-butylcyclohexyl) peroxydicarbonate, p-chlorobenzoyl peroxide, t-butylperoxy-2-ethylhexanoate, t-butyl peroxybenzoate, 1,1-bis(t-butylperoxy)-3,5,5-trimethylcyclohexane, 2,5-dimethylhexane-2,5-dihydroperoxide, α,α-bis(t-butylperoxy)-p-diisopropylbenzene, t-butyl peroxybenzene, and t-butyl peroxymaleic acid.

Among them, 2,5-dimethyl-2,5-di(t-butylperoxy)hexane, 2,4-dichlorobenzoyl peroxide, dicumyl peroxide, benzoyl peroxide, and α,α'-bis(t-butylperoxy-m-isopropyl)benzene are preferable, and 2,5-dimethyl-2,5-di(t-butylperoxy) hexane is more preferable.

When the present composition includes a crosslinking agent, the content of the crosslinking agent in the present composition is preferably 0.2 to 4 parts by mass, and more preferably 0.2 to 2.5 parts by mass based on 100 parts by mass of the crosslinkable fluoroelastomer (A), from the viewpoints that, for example, crosslinking reaction sufficiently proceeds, and a sealing material excellent in hardness, tensile strength, elongation at break, and 100% Mo in a well-balanced manner can be easily obtained.

<Crosslinking Aid>

In the present composition, the crosslinking agent may be used singly, but in the case of using the crosslinking agent, it is preferable to use a crosslinking aid. As the crosslinking aid, a known crosslinking aid may be selected depending on the kind of crosslinking agent.

When the present composition contains a crosslinking aid, the crosslinking aid contained in the present composition may be one kind or two or more kinds.

Examples of the crosslinking aid to be used in the case of using a peroxide crosslinking agent include compounds capable of radically co-crosslinking (polyfunctional monomers) such as triallyl isocyanurate; triallyl cyanurate; trimethallyl isocyanurate; triallyl formal; triallyl trimellitate; N,N'-m-phenylenebismaleimide; dipropargyl terephthalate; diallyl phthalate; tetraallyl terephthalamide; and polyfunctional (meth)acrylates, for example, ethylene glycol di(meth)acrylate and trimethylolpropane tri(meth)acrylate: metal salts of higher carboxylic acids: polyhydric alcohol (meth) acrylates: and (meth)acrylic acid metal salts.

Among them, triallyl isocyanurate is preferable from the viewpoints of, for example, excellent reactivity, and being capable of easily obtaining a sealing material having excellent heat resistance, high hardness, and high modulus.

When the present composition includes a crosslinking aid, the content of the crosslinking aid in the present composition is preferably 1 part by mass or more, more preferably 2 parts by mass or more, still more preferably 4 parts by mass or more, and preferably 10 parts by mass or less, more preferably 7 parts by mass or less, still more preferably 6 parts by mass or less based on 100 parts by mass of the crosslinkable fluoroelastomer (A) from the viewpoints that, for example, the crosslinking reaction sufficiently proceeds, and a sealing material excellent in hardness, tensile strength, elongation at break, and 100% Mo in a well-balanced manner can be easily obtained.

In particular, in order to suppress cracks that may be generated in the sealing material, for example, in a plasma atmosphere, a radiation-crosslinked sealing material (radiation-treated product) is preferable. In this case, the content of the crosslinking aid in the present composition is preferably 2 parts by mass or more, more preferably 4 parts by mass or more, and preferably 7 parts by mass or less, more preferably 6 parts by mass or less based on 100 parts by mass of the crosslinkable fluoroelastomer (A) from the viewpoint that, for example, a sealing material having higher hardness and higher modulus can be easily obtained without using a filler as described below.

The mass ratio of the content of the crosslinking aid to the content of the crosslinking agent in the present composition (the content of the crosslinking aid/the content of the crosslinking agent) is preferably 2 or more, more preferably 4 or more, still more preferably 6 or more, and preferably 30 or less, more preferably 20 or less from the viewpoints of, for example, allowing the crosslinking agent to react without excess or deficiency and being capable of easily obtaining a sealing material exhibiting desired physical properties, particularly from the viewpoint of, for example, being capable of easily obtaining a sealing material having higher hardness and higher modulus without using a filler as described below.

<Other Components>

In addition to the above components, the present composition may contain, as necessary, conventionally known other components that have been blended in the sealing material as long as the effects of the present invention are not impaired. Examples of the other component include reactive organosilicon compounds having two or more hydrosilyl groups in the molecule; catalysts; polyol compounds; acid acceptors such as magnesium oxide and calcium hydroxide; organic pigments such as anthraquinone pigments, perylene pigments, and dioxazine pigments; plasticizers; processing aids; vulcanization accelerators; antiaging agents; antioxidants; inorganic fillers; and organic fillers.

Each of the other components used may be one kind only or two or more kinds.

[Reactive Organosilicon Compound]

Suitable examples of the reactive organosilicon compound include compounds which are the same as the organosilicon compounds described in, for example, JP 2003-183402 A and JP H11-116684 A

[Catalyst]

Suitable examples of the catalyst include catalysts which are the same as the catalysts described in, for example, JP 2003-183402 A and JP H11-116684 A.

[Polyol Compound]

By using the polyol compound, a sealing material having excellent crack resistance in a plasma environment can be easily formed without impairing the performance as a sealing material.

As the polyol compound, conventionally known compounds can be widely used, but bisphenols are preferable from the viewpoint that, for example, a sealing material particularly excellent in crack resistance can be easily obtained.

Examples of the bisphenols include 2,2-bis(4-hydroxyphenyl)perfluoropropane (Bisphenol AF), 2,2-bis(4-hydroxyphenyl)propane (Bisphenol A), and bis(4-hydroxyphenyl) sulfone (Bisphenol S), and salts such as alkali metal salts and alkaline earth metal salts of these compounds may be used. Among them, for example, Bisphenol AF and Bisphenol A are preferable, and Bisphenol AF is more preferable from the viewpoint that, for example, a sealing material particularly excellent in crack resistance can be easily obtained.

When the present composition includes a polyol compound, the content of the polyol compound in the present composition is preferably 0.1 to 3 parts by mass, more preferably 0.1 to 2 parts by mass, and still more preferably 0.1 to 1 part by mass based on 100 parts by mass of the crosslinkable fluoroelastomer (A), from the viewpoint of, for example, being capable of easily obtaining a sealing material excellent in crack resistance, having small compressive strain, and excellent in vulcanization rate.

[Organic Pigment]

Suitable examples of the organic pigment include organic pigments which are the same as the organic pigments described in, for example, WO 2016/043100 A, JP 4720501 B2, and WO 2004/094527 A.

[Filler]

The inorganic filler and the organic filler (hereinafter, these are also collectively and simply referred to as a "filler") are particulate (powdery) components other than the compound (B), the crosslinking agent, and the crosslinking aid.

Examples of the inorganic filler include carbon black, silica, barium sulfate, titanium oxide, and aluminum oxide.

Examples of the organic filler include fluororesins such as PTFE, PFA, FEP, ETFE, and PVDF, polyethylene resins, polyimide resins, silicone resins, and melamine resins.

When the present composition is used for production of such a sealing material in which generation of particles, for example, in a plasma atmosphere is a problem, the content of the filler is preferably 5 parts by mass or less, more preferably 3 parts by mass or less, and most preferably 0 parts by mass based on 100 parts by mass of the crosslinkable fluoroelastomer (A).

<Method for Producing Present Composition>

The present composition can be produced by mixing (kneading) a predetermined amount of the crosslinkable fluoroelastomer (A1) and the crosslinkable fluoroelastomer (A2), and preferably by mixing (kneading) these elastomers (A1) and (A2), the compound (B), a crosslinking agent, a crosslinking aid, and the other components as necessary.

The order of mixing the elastomers (A1) and (A2) with additives such as the compound (B), the crosslinking agent, the crosslinking aid, and the other components is not particularly limited. They may be sequentially mixed (kneaded) in any order, or may be mixed (kneaded) all at once, but it is preferable that they are sequentially mixed (kneaded) such that the respective components are uniform.

At the time of the mixing (kneading), a conventionally known mixing (kneading) machine can be used, and examples thereof include an open roll, a Banbury mixer, a biaxial roll, and a kneader.

At the time of the mixing (kneading), mixing (kneading) may be performed under heating or cooling as necessary depending on a mixing (kneading) machine.

<<Sealing Material>>

The sealing material according to one embodiment of the present invention (hereinafter, also referred to as the "present sealing material") is a sealing material obtained from the present composition.

Since the present sealing material is obtained from the present composition, it is excellent in hardness, tensile strength, elongation at break, and 100% Mo in a well-balanced manner, and further excellent in, for example, plasma resistance (radical resistance), crack resistance, and compression set.

The present sealing material can be used as, for example, a gasket or packing of various members, and can be suitably used particularly for a semiconductor manufacturing apparatus, or a plasma processing apparatus, and particularly for a drive unit including a gate valve used for an opening of a plasma processing chamber unit due to the sealing material exhibiting the above effects.

The present sealing material has, for example, a shape that may be appropriately selected depending on the intended use.

When the present sealing material is produced through the following step of irradiating with radiation, the present sealing material can be a sealing material that has the following physical properties despite not containing the filler.

The 100% modulus of the present sealing material measured according to JIS K 6251: 2017 is preferably 4 MPa or more.

The Shore A hardness (Type A durometer hardness) of the present sealing material measured according to JIS K 6253: 2012 is preferably 60 or more.

The tensile strength of the present sealing material measured according to JIS K 6251: 2017 is preferably 7 MPa or more, and more preferably 9 MPa or more.

The elongation at break of the present sealing material measured according to JIS K 6251: 2017 is preferably 120% or more, and more preferably 130% or more.

When the present sealing material is produced without performing the following step of irradiating with radiation, the present sealing material can be a sealing material that has the following physical properties despite not containing the filler.

The 100% modulus of the present sealing material measured according to JIS K 6251: 2017 is preferably 1.3 MPa or more.

The Shore A hardness (Type A durometer hardness) of the present sealing material measured according to JIS K 6253: 2012 is preferably 55 or more.

The tensile strength of the present sealing material measured according to JIS K 6251: 2017 is preferably 10 MPa or more.

The elongation at break of the present sealing material measured according to JIS K 6251: 2017 is preferably 180% or more.

<Method for Producing Present Sealing Material>

Specifically, the present sealing material can be produced by molding the present composition, but is preferably a crosslinked product obtained by a method including a step of subjecting the present composition to a crosslinking treatment (crosslinking step), from the viewpoint that, for example, a sealing material having more excellent, for example, plasma resistance (radical resistance), crack resistance, and non-adhesiveness, and excellent in hardness, tensile strength, elongation at break, and 100% Mo in a well-balanced manner can be easily obtained.

At the time of forming a sealing material from the present composition, it is preferable to perform the sheeting step from the viewpoints of, for example, improving the efficiency of the molding operation and reducing the defect rate. This sheeting step is usually performed using, for example, a roll, and is usually also a step of preliminarily forming the present composition into a sheet.

The sheet obtained in the sheeting step is preferably preformed into a desired sealing material shape before the crosslinking step.

In this preforming, a desired sealing material shape may be directly formed from the sheet obtained in the sheeting step, or the sheet obtained in the sheeting step may be formed into, for example, a rope shape (having the same meaning as, for example, a ribbon shape or a noodle shape) by, for example, cutting or extrusion molding, and then the obtained rope-shaped product may be formed into a desired sealing material shape.

The crosslinking step more preferably includes a primary crosslinking step and a secondary crosslinking step.

The crosslinking step is preferably performed using a desired sealing material-shaped object that is obtained in the preforming.

The primary crosslinking step is preferably a step of heating and pressurizing a desired sealing material-shaped object that is obtained in the preforming, and as a specific example, there may be mentioned a step of crosslinking the preformed material which is cast into a mold, at a temperature of, for example, 150 to 200° C. for, for example, about 5 to 20 minutes under a pressure of about 2 to 15 MPa by, for example, a heating press machine.

The secondary crosslinking step is preferably a step of heating the molded body obtained in the primary crosslinking step, and as a specific example, there may be mentioned a step of heating the molded body at a temperature of, for example, 150 to 300° C. for about 1 to 24 hours, more preferably about 3 to 24 hours using various ovens, preferably a vacuum oven, under from normal pressure to reduced pressure.

By this secondary crosslinking step, crosslinking can be promoted, or even if an unreacted component remains after the primary crosslinking step, the unreacted component can be decomposed and volatilized, and a sealing material with less generation of release gas can be obtained.

In the method for producing the present sealing material, a step of irradiation with radiation (step of irradiating with radiation) may be performed after the crosslinking step from the viewpoint of, for example, more easily suppressing a crack that may occur in the sealing material, for example, in a plasma atmosphere. The present sealing material obtained through the step of irradiating with radiation can be said to be a radiation-treated product.

The radiation used for irradiation in the step of irradiating with radiation is not particularly limited as long as it can crosslink the crosslinkable fluoroelastomer (A). Examples thereof include an X-ray, a gamma ray, an electron beam, a proton beam, a neutron beam, a heavy particle beam, an alpha beam, and a beta beam, and among these, a gamma ray and an electron beam are preferable.

The radiation used for irradiation may be one kind or two or more kinds.

At the time of irradiating with radiation, it is desirable to irradiate with radiation such that the absorbed dose is preferably 1 to 120 kGy, and more preferably 20 to 100 kGy. When radiation is applied in such an amount, it is possible to reduce unreacted components that may be particles or release gas, and a sealing material excellent in, for example, plasma resistance and crack resistance can be easily obtained without excessively reducing the molecular weight of the crosslinkable fluoroelastomer (A).

The step of irradiating with radiation may be performed in two or more stages with conditions changed.

At the time of irradiating with radiation, irradiation may be performed in the air. However, when oxygen is present at the time of irradiating with radiation, the crosslinking reaction may be inhibited, and there is a possibility that the mechanical strength of the sealing material is reduced or stickiness appears on the surface of the sealing material. Thus, the step of irradiating with radiation is preferably performed in an atmosphere of an inert gas such as nitrogen or argon.

EXAMPLES

Next, the present invention will be described in more detail with reference to examples, but the present invention is not limited thereto.

<Crosslinkable Fluoroelastomer>

The crosslinkable fluoroelastomers used in the following examples and comparative examples are as follows.

- Crosslinkable fluoroelastomer (A1-a): Tecnoflon P959 (fluorine content: 70% by mass, manufactured by Solvay)
- Crosslinkable fluoroelastomer (A1-b): Tecnoflon P459 (fluorine content: 70% by mass, manufactured by Solvay)
- Crosslinkable fluoroelastomer (A1-c): DAI-EL G912 (fluorine content: 71% by mass, manufactured by DAIKIN INDUSTRIES, LTD.)
- Crosslinkable fluoroelastomer (A1-d): DAI-EL G902 (fluorine content: 71% by mass, manufactured by DAIKIN INDUSTRIES, LTD.)
- Crosslinkable fluoroelastomer (A2-a): Tecnoflon P757 (fluorine content: 67% by mass, manufactured by Solvay)
- Crosslinkable fluoroelastomer (A2-b): Tecnoflon P457 (fluorine content: 67% by mass, manufactured by Solvay)
- Crosslinkable fluoroelastomer (A2-c): DAI-EL G801 (fluorine content: 66% by mass, manufactured by DAIKIN INDUSTRIES, LTD.)
- Crosslinkable fluoroelastomer (A2-d): Tecnoflon PL855 (fluorine content: 64% by mass, manufactured by Solvay)
- Crosslinkable fluoroelastomer (A2-e): DAI-EL LT302 (fluorine content: 65% by mass, manufactured by DAIKIN INDUSTRIES, LTD.)
- Crosslinkable fluoroelastomer (A2-f): AFLAS 100S (fluorine content: 57% by mass, manufactured by AGC Inc.)

Example 1

Into a kneader, 70 parts by mass of the crosslinkable fluoroelastomer (A1-a), 30 parts by mass of the crosslinkable fluoroelastomer (A2-a), 1.0 parts by mass of SIFEL 8070A (manufactured by Shin-Etsu Chemical Co., Ltd.), 1.0 parts by mass of SIFEL 8070B (manufactured by Shin-Etsu Chemical Co., Ltd.), 6.0 parts by mass of TRIC (triallyl isocyanurate, manufactured by Mitsubishi Chemical Corporation), and 0.5 parts by mass of PERHEXA 25B (manufactured by NOF CORPORATION) were sequentially fed and the contents were kneaded until the current value was stabilized to obtain a bulk elastomer composition.

At least one of SIFEL 8070A and SIFEL 8070B contains a compound having a perfluoro skeleton having an ethylenically unsaturated bond.

The total time from the addition of the first component into the kneader to the time when the current value was stabilized after the addition of the final component was defined as the kneading time by the kneader. The results are shown in Table 1.

In general, in the case of kneading using a kneader, the current value is stabilized when each component added is uniformly kneaded. Thus, using this as an indication of completion of kneading, it is often determined that a uniform composition has been obtained at the time when the current value is stabilized.

The resulting bulk elastomer composition was subjected to a sheeting step (sheet forming step) using a roll (roll interval: 8 mm, temperature: 50° C.)

The sheeting property was evaluated as follows. The case where a sheet was able to be formed from the bulk elastomer composition at this step was rated as "OK" in terms of the sheeting property, and the case where the elastomer composition was not caught between rolls or the adhesion to rolls was poor, failing to obtain a good sheet by sheeting was rated as "NG" in terms of the sheeting property. The results are shown in Table 1.

The sheet obtained in the sheeting step was press-molded at 170° C. for 10 minutes under a pressure of 5 MPa using a compression vacuum press machine (primary crosslinking), and then the sheet after the press-molding was heated at 200° C. for 16 hours under reduced pressure in a vacuum oven (degree of vacuum: 50 Pa) (secondary crosslinking). Thereafter, the secondary-crosslinked sheet was irradiated with radiation such that the absorbed dose was 80 kGy, thereby obtaining a molded body.

The obtained molded body was measured for the following normal physical properties. The results are shown in Table 1.

<Normal Physical Properties>

As normal physical properties, the Shore A hardness was measured in accordance with JIS K 6253: 2012, and the tensile strength, the elongation at break, and the tensile stress at 100% elongation (100% Mo) were measured in accordance with JIS K 6251: 2017.

Examples 2 to 5 and Comparative Examples 1 and 2

Various evaluations were performed in the same manner as in Example 1 except that the crosslinkable fluoroelastomers shown in Table 1 were used in the amounts shown in Table 1 instead of the crosslinkable fluoroelastomers used in Example 1. The results are shown in Table 1.

TABLE 1

| | | Example | | | | | Comparative Example | |
|---|---|---|---|---|---|---|---|---|
| | | 1 | 2 | 3 | 4 | 5 | 1 | 2 |
| Crosslinkable fluoroelastomer (A1-a) | | 70 | 45 | 65 | 20 | 40 | 100 | 70 |
| Crosslinkable fluoroelastomer (A1-b) | | | 45 | 25 | 60 | 40 | | 30 |
| Crosslinkable fluoroelastomer (A1-c) | | | | | | | | |
| Crosslinkable fluoroelastomer (A2-a) | | 30 | 10 | 10 | 20 | 20 | | |
| Kneading time by kneader (time) | | 0:52 | 1:29 | 1:13 | 1:25 | 1:09 | 1:54 | 1:45 |
| Sheeting property | | OK | OK | OK | OK | OK | NG | NG |
| Normal properties physical | Hardness (shore A) | 66 | 67 | 67 | 66 | 66 | — | — |
| | Tensile strength (MPa) | 15.6 | 14.4 | 13.6 | 11.1 | 11.8 | — | — |
| | Elongation at break (%) | 180 | 170 | 160 | 150 | 150 | — | — |
| | 100% Mo(MPa) | 4.5 | 5.0 | 5.7 | 5.4 | 5.7 | — | — |

It was found that, in Examples 1 to 5, the time required to produce a uniform elastomer composition was short, and the elastomer compositions obtained in Examples 1 to 5 were excellent in sheeting property (sheet moldability).

In Comparative Examples 1 and 2, it took a long time to produce a uniform elastomer composition, and the elastomer compositions obtained in Comparative Examples 1 and 2 had poor sheeting property, and specifically, the elastomer composition was not caught between rolls or was not well wound around rolls, failing to form a good sheet.

Examples 6 to 11 and Comparative Examples 3 and 4

Bulk elastomer compositions were obtained in the same manner as in Example 1 except that the crosslinkable fluoroelastomers shown in Table 2 were used in the amounts shown in Table 2 instead of the crosslinkable fluoroelastomers used in Example 1.

However, in Examples 9 and 10, the amount of TRIC used was 5.5 parts by mass. In Example 11, the amount of SIFEL 8070A used was 2.0 parts by mass, the amount of SIFEL 8070B used was 2.0 parts by mass, the amount of TRIC used was 5.0 parts by mass, and the amount of PERHEXA 25B used was 1.0 parts by mass.

The obtained bulk elastomer composition was filled in a mold, and press-molded at 170° C. for 10 minutes under a pressure of 5 MPa using a compression vacuum press machine (primary crosslinking), and then the sheet after the press-molding was heated at 200° C. for 16 hours under reduced pressure in a vacuum oven (degree of vacuum: 50 Pa) (secondary crosslinking). Thereafter, the secondary-crosslinked sheet was irradiated with radiation such that the absorbed dose was 80 kGy, thereby obtaining a molded body.

The obtained molded body was measured for the normal physical properties. The results are shown in Table 2.

TABLE 2

| | Example | | | | | | Comparative Example | |
|---|---|---|---|---|---|---|---|---|
| | 6 | 7 | 8 | 9 | 10 | 11 | 3 | 4 |
| Crosslinkable fluoroelastomer (A1-a) | | | | | | | | |
| Crosslinkable fluoroelastomer (A1-b) | | 70 | | | | | | |
| Crosslinkable fluoroelastomer (A1-c) | | | 70 | 90 | 80 | 70 | | |
| Crosslinkable fluoroelastomer (A1-d) | 70 | | | | | | | |
| Crosslinkable fluoroelastomer (A2-a) | 30 | 30 | | | | | 30 | 100 |
| Crosslinkable fluoroelastomer (A2-b) | | | | | | | 70 | |

TABLE 2-continued

| | | Example | | | | | | Comparative Example | |
|---|---|---|---|---|---|---|---|---|---|
| | | 6 | 7 | 8 | 9 | 10 | 11 | 3 | 4 |
| Crosslinkable fluoroelastomer (A2-c) | | | | | 10 | 20 | | | |
| Crosslinkable fluoroelastomer (A2-d) | | | | 30 | | | | | |
| Crosslinkable fluoroelastomer (A2-f) | | | | | | | 30 | | |
| Normal physical properties | Hardness (shore A) | 63 | 66 | 65 | 65 | 65 | 65 | 60 | 61 |
| | Tensile strength (MPa) | 11.9 | 11.5 | 9.5 | 7.5 | 9.1 | 11.7 | 7.2 | 9.9 |
| | Elongation at break (%) | 145 | 140 | 125 | 120 | 135 | 160 | 150 | 195 |
| | 100% Mo(MPa) | 4.20 | 4.92 | 5.10 | 4.50 | 4.65 | 4.12 | 2.20 | 3.09 |

Example 12

Into a kneader, 70 parts by mass of the crosslinkable fluoroelastomer (A1-c), 30 parts by mass of the crosslinkable fluoroelastomer (A2-a), 2 parts by mass of SIFEL 3590-N (containing a compound having a perfluoro skeleton having an ethylenically unsaturated bond, one-component liquid type, manufactured by Shin-Etsu Chemical Co., Ltd.), 6 parts by mass of TRIC, and 1 part by mass of PERHEXA 25B were sequentially fed and the contents were kneaded until the current value was stabilized to obtain a bulk elastomer composition.

Using the obtained bulk elastomer composition, a molded body was obtained in the same manner as in Example 6.

The obtained molded body was measured for the normal physical properties and the following plasma resistance 1. The results are shown in Table 3.

Example 13

Into a kneader, 70 parts by mass of the crosslinkable fluoroelastomer (A1-c), 30 parts by mass of the crosslinkable fluoroelastomer (A2-a), 10 parts by mass of SIFEL 3590-N, 6 parts by mass of TRIC, and 1 part by mass of PERHEXA 25B were sequentially fed and the contents were kneaded until the current value was stabilized to obtain a bulk elastomer composition.

Using the obtained bulk elastomer composition, a molded body was obtained in the same manner as in Example 6.

The obtained molded body was measured for the normal physical properties and the following plasma resistance 1. The results are shown in Table 3.

Example 14

Into a kneader, 70 parts by mass of the crosslinkable fluoroelastomer (A1-c), 30 parts by mass of the crosslinkable fluoroelastomer (A2-a), 2 parts by mass of KE-1830 (containing a compound having a siloxane skeleton having an ethylenically unsaturated bond, one-component liquid type, manufactured by Shin-Etsu Chemical Co., Ltd.), 6 parts by mass of TRIC, and 0.5 parts by mass of PERHEXA 25B were sequentially fed and the contents were kneaded until the current value was stabilized to obtain a bulk elastomer composition.

Using the obtained bulk elastomer composition, a molded body was obtained in the same manner as in Example 6.

The obtained molded body was measured for the normal physical properties and the following plasma resistance 1. The results are shown in Table 3.

<Plasma Resistance 1>

The obtained molded body was measured for the plasma resistance (mass reduction ratio). Specifically, measurement was performed as follows.

Using a flat plate plasma processing apparatus having an electrode diameter of (000 mm and an inter-electrode distance of 50 mm, the obtained molded body was irradiated with plasma for 3 hours under the conditions of an RF 500 W, a $CF_4$ gas flow rate of 50 sccm, an $O_2$ gas flow rate of 150 sccm, and a degree of vacuum of 1 torr.

The obtained molded body was placed at a position 6 cm away from the plasma electrode. Next, the mass of the molded body before and after the test was measured, and the mass reduction ratio (%) was determined by the following formula to evaluate the plasma resistance. It can be said that the smaller the mass reduction ratio is, the better the plasma resistance is.

Mass reduction ratio (%)=[(mass of molded body before test−mass of molded body after test)/mass of molded body before test]×100

TABLE 3

| | | Example | | |
|---|---|---|---|---|
| | | 12 | 13 | 14 |
| Crosslinkable fluoroelastomer (A1-c) | | 70 | 70 | 70 |
| Crosslinkable fluoroelastomer (A2-a) | | 30 | 30 | 30 |
| Normal physical properties | Hardness (shore A) | 69 | 68 | 70 |
| | Tensile strength (MPa) | 10.1 | 11.2 | 10.2 |
| | Elongation at break (%) | 145 | 160 | 135 |
| | 100% Mo(MPa) | 6.3 | 5.5 | 6.1 |
| Plasma resistance | Mass reduction ratio (%) | 0.78 | 0.57 | 1.10 |

Examples 15 to 18 and Comparative Examples 5 to 7

Bulk elastomer compositions were obtained in the same manner as in Example 1 except that the crosslinkable fluoroelastomers shown in Table 4 were used in the amounts shown in Table 4 instead of the crosslinkable fluoroelastomers used in Example 1.

However, in Example 18, the amount of SIFEL 8070A used was 3 parts by mass, and the amount of SIFEL 8070B used was 3 parts by mass.

The obtained bulk elastomer composition was filled in a mold, and press-molded at 170° C. for 10 minutes under a pressure of 5 MPa using a compression vacuum press machine (primary crosslinking), and then the sheet after the press-molding was heated at 200° C. for 16 hours under reduced pressure in a vacuum oven (degree of vacuum: 50 Pa) (secondary crosslinking).

The obtained molded body was measured for the normal physical properties and the following plasma resistance 2. The results are shown in Table 4.

<Plasma Resistance 2>

The obtained molded body was measured for the plasma resistance (mass reduction ratio). Specifically, measurement was performed as follows.

Using a flat plate plasma processing apparatus having an electrode diameter of (000 mm and an inter-electrode distance of 50 mm, the obtained molded body was irradiated with plasma for 3 hours under the conditions of an RF 1000 W, a flow rate ratio of $O_2$ gas to $CF_4$ gas ($O_2$:$CF_4$) of 190:10, a gas flow rate of 200 sccm, and a degree of vacuum of 1 torr.

The obtained molded body was placed at a position 6 cm away from the plasma electrode. Next, the mass of the molded body before and after the test was measured, and the mass reduction ratio (%) was determined by the following formula to evaluate the plasma resistance. It can be said that the smaller the mass reduction ratio is, the better the plasma resistance is.

Mass reduction ratio (%)=[(mass of molded body before test−mass of molded body after test)/mass of molded body before test]×100

TABLE 4

| | | Example | | | | Comparative Example | | |
|---|---|---|---|---|---|---|---|---|
| | | 15 | 16 | 17 | 18 | 5 | 6 | 7 |
| Crosslinkable fluoroelastomer (A1-a) | | 70 | | | | | | |
| Crosslinkable fluoroelastomer (A1-c) | | | 70 | 70 | 90 | | 50 | |
| Crosslinkable fluoroelastomer (A2-a) | | 30 | 30 | | | 30 | | 100 |
| Crosslinkable fluoroelastomer (A2-b) | | | | | | 70 | | |
| Crosslinkable fluoroelastomer (A2-d) | | | | 30 | | | | |
| Crosslinkable fluoroelastomer (A2-e) | | | | | 10 | | 50 | |
| Normal physical properties | Hardness (shore A) | 55 | 57 | 59 | 57 | 54 | 52 | 53 |
| | Tensile strength (MPa) | 17.7 | 12.2 | 12.2 | 10.9 | 14.3 | 10.8 | 20.3 |
| | Elongation at break (%) | 360 | 275 | 260 | 275 | 460 | 300 | 510 |
| | 100% Mo(MPa) | 1.34 | 1.56 | 1.52 | 1.5 | 1.15 | 1.1 | 1.14 |
| Plasma resistance | Mass reduction ratio (%) | 1.08 | 1.05 | 1.10 | 0.49 | 1.32 | 0.80 | 1.30 |

Example 19 and Comparative Example 8

Bulk elastomer compositions were obtained in the same manner as in Example 1 except that the crosslinkable fluoroelastomers shown in Table 5 were used in the amounts shown in Table 5 instead of the crosslinkable fluoroelastomers used in Example 1, the amount of each of SIFELs 8070A and 8070B used was 2.0 parts by mass, the amount of TRIC used was 4.0 parts by mass, the amount of PERHEXA 25B used was 2.0 parts by mass, and further, 0.5 parts by mass of Bisphenol AF (manufactured by Tokyo Chemical Industry Co., Ltd.) was used.

Using the obtained bulk elastomer composition, a molded body was obtained in the same manner as in Example 15.

The obtained molded body was measured for the normal physical properties and the plasma resistance 2. The results are shown in Table 5.

TABLE 5

| | | Example 19 | Comparative Example 8 |
|---|---|---|---|
| Crosslinkable fluoroelastomer (A1-c) | | 80 | |
| Crosslinkable fluoroelastomer (A2-b) | | | 80 |
| Crosslinkable fluoroelastomer (A2-e) | | 20 | 20 |
| Normal physical properties | Hardness (shore A) | 57 | 52 |
| | Tensile strength (MPa) | 12.0 | 11.9 |
| | Elongation at break (%) | 205 | 365 |
| | 100% Mo(MPa) | 2.19 | 1.05 |
| Plasma resistance | Mass reduction ratio (%) | 1.07 | 1.27 |

Example 20

Into a kneader, 70 parts by mass of the crosslinkable fluoroelastomer (A1-c), 30 parts by mass of the crosslinkable fluoroelastomer (A2-a), 2 parts by mass of SIFEL 3590-N, 6 parts by mass of TRIC, and 0.5 parts by mass of PERHEXA 25B were sequentially fed and the contents were kneaded until the current value was stabilized to obtain a bulk elastomer composition.

Using the obtained bulk elastomer composition, a molded body was obtained in the same manner as in Example 15.

The obtained molded body was measured for the normal physical properties and the plasma resistance 1. The results are shown in Table 6.

Example 21

A bulk elastomer composition was obtained in the same manner as in Example 20 except that 2 parts by mass of KE-1830 was used instead of 2 parts by mass of SIFEL 3590-N in Example 20.

Using the obtained bulk elastomer composition, a molded body was obtained in the same manner as in Example 15.

The obtained molded body was measured for the normal physical properties and the plasma resistance 1. The results are shown in Table 6.

Example 22

A bulk elastomer composition was obtained in the same manner as in Example 20 except that SIFEL 3590-N in Example 20 was not used.

Using the obtained bulk elastomer composition, a molded body was obtained in the same manner as in Example 15.

The obtained molded body was measured for the normal physical properties and the plasma resistance 1. The results are shown in Table 6.

TABLE 6

| | | Example | | |
|---|---|---|---|---|
| | | 20 | 21 | 22 |
| Crosslinkable fluoroelastomer (A1-c) | | 70 | 70 | 70 |
| Crosslinkable fluoroelastomer (A2-a) | | 30 | 30 | 30 |
| Normal physical properties | Hardness (shore A) | 56 | 59 | 59 |
| | Tensile strength (MPa) | 11.7 | 14.3 | 11.1 |
| | Elongation at break (%) | 300 | 275 | 275 |
| | 100% Mo(MPa) | 1.5 | 1.9 | 1.5 |
| Plasma resistance | Mass reduction ratio (%) | 0.66 | 1.10 | 0.98 |

The invention claimed is:

1. An elastomer composition comprising:

a crosslinkable fluoroelastomer (A1) that is other than a perfluoroelastomer and has a fluorine content of 69% by mass or more; and a crosslinkable fluoroelastomer (A2) that is other than a perfluoroelastomer and has a fluorine content in a range of 55 to 68% by mass, wherein a content of the fluoroelastomer (A1) is 60 to 95% by mass based on 100% by mass of a total of the fluoroelastomers (A1) and (A2), and wherein the fluoroelastomer (A2) is at least one compound selected from a vinylidene fluoride-propylene-tetrafluoroethylene polymer, an ethylene-tetrafluoro-ethylene-perfluoroalkyl vinyl ether polymer, and a vinylidene fluoride-tetrafluoroethylene-perfluoroalkyl vinyl ether polymer.

2. The elastomer composition according to claim 1, wherein the fluoroelastomers (A1) and (A2) are peroxide-crosslinkable fluoroelastomers.

3. The elastomer composition according to claim 1, comprising at least one ethylenically unsaturated bond-containing compound (B) selected from compounds having a perfluoro skeleton having an ethylenically unsaturated bond and compounds having a siloxane skeleton having an ethylenically unsaturated bond.

4. The elastomer composition according to claim 1, comprising a crosslinking agent.

5. The elastomer composition according to claim 1, wherein a content of a filler is 5 parts by mass or less based on 100 parts by mass of a total of the fluoroelastomers (A1) and (A2).

6. A sealing material obtained from the elastomer composition according to claim 1.

7. A method for producing a sealing material, comprising a step of crosslinking the elastomer composition according to claim 1.

* * * * *